May 24, 1932.  R. R. MacKENZIE  1,859,832
CONVERTIBLE WHEEL
Filed July 20, 1931  2 Sheets-Sheet 1

INVENTOR
ROY R. MACKENZIE.
BY
ATTORNEY

Patented May 24, 1932

1,859,832

UNITED STATES PATENT OFFICE

ROY R. MacKENZIE, OF HUNTINGTON PARK, CALIFORNIA

CONVERTIBLE WHEEL

Application filed July 20, 1931. Serial No. 552,039.

My invention relates to vehicles and more particularly has references to a novel type of wheel to be associated therewith.

The desirability of perfecting a wheel which may be employed for railway as well as highway usage has long been recognized. With the advent of the automobile and its development within recent years to such an extent that it is now a highly efficient and economical carrier, the advantages of providing such a wheel for use therewith, have not been lessened, but have been greatly enhanced.

In the past, however, improvements of this nature have been limited to use with railway rolling stock rather than with highway vehicles. Moreover, the general practice, has been to form a solid one piece highway wheel and secure this to the railway or master wheel by bolts, passing through the face of the latter. Such constructions, cannot be constantly carried by the master wheel, just referred to, and moreover, because of their solid one piece construction, are exceedingly cumbersome and difficult to mount or apply.

But few attempts have been made to associate with the master or main wheel carried upon an axle, parts of an auxiliary wheel which may be placed in an operative and inoperative position so that the vehicle may be converted or transformed for travel either upon a highway or a railway. Constructions of this nature, heretofore used have required a multiplicity of parts to form the auxiliary wheel, each one of which must be placed into its operative and inoperative position by hand and likewise secured in such positions manually.

The major object of my invention is to provide a novel type of vehicle wheel which may be employed for either highway or railway usage.

An equally important object of this invention is the provision of a master wheel in the nature of a railway wheel adapted to carry suitable members which when properly positioned will allow the wheel to be used upon a highway or a railway.

Another object of my invention is to provide a railway wheel having a shoulder formed thereon in addition to the rail tread, the shoulder serving as a seat for the members of a highway wheel adapted to be positioned thereon.

Another object of my invention is to provide a railway wheel having carried thereon the parts of a highway wheel, these parts including a plurality of rim sections with a rubber tire mounted thereon, each of which are maintained in an operative and inoperative position through spring controlled means.

Still another object of my invention is the devising of suitable apparatus adapted to be associated with a vehicle for shifting the highway wheel members, carried by the convertible wheels thereof, into an out of operative position so that the vehicle may be transformed to either the highway or the railway type as desired.

A further object of my invention is to mount upon a master wheel of railroad type, a plurality of highway members, each including a sleeve pivotally mounted on the hub of the master wheel, a spring pressed spoke or tire arm slidably mounted in the sleeve, and a rim and tire section secured to the tire arm.

A still further object of my invention is the provision of a novel wheel for railway purposes, having a shoulder formed thereon, upon which the circular segments of a rim with rubber tire attached thereto, may be positioned and secured by bolts, passing through the periphery of the shoulder.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit of the invention and the scope of the appended claims.

As previously noted, the invention comprehends the provision of a wheel which may be employed either upon a highway or a railway. One manner of practically effecting the concept of this invention, is to form upon a railway wheel a shoulder, in addition to the rail tread, the shoulder being so constructed as to form a seat for a plurality of rim and tire sections or segments of an equal number of highway members. Each of these rim sections are intended to be secured to a spring pressed arm, the opposite end of which is slidably mounted within a sleeve which is pivotally secured upon the face of the railway wheel. These arms with rim sections are, when in operative position, positioned so as to cause the wheel to function as a highway wheel, and are swung outwardly from the wheel face and then raised by reason of their springs so as to clear the shoulder and seat thereon, the arms passing through cut away portions in the shoulder. For the purpose of shifting these arms, which if desired may be done by hand, each tire arm is provided with a puller or placement arm extending at right angles thereto.

Associated with the vehicle, and carried upon suitable frames, are a plurality of cam surfaces which may be moved against a puller arm and upon rotation of the wheel, guide its tire arm into an out of operative position. Through suitable means, the frames just mentioned, may be operated simultaneously so that all of the wheels of the vehicle may be changed from one type to another at the same time.

Also contemplated by my invention is the use of a master wheel, of the type described, but employing therewith a plurality of light weight rim segments or sections with rubber tires attached. These sections are placed upon the shoulder of the railway wheel and bolted thereto by bolts extending through the shoulder and in a plane substantially perpendicular to the axis of rotation.

In order to make my invention more clearly understood, I have shown in the accompanying drawings, means for carrying the same into practical effect without limiting the improvements in their useful applications to the particular constructions which, for the purpose of explanation, have been made the subject of illustration.

Figures 1, 2, 3, 4, 5, 6:
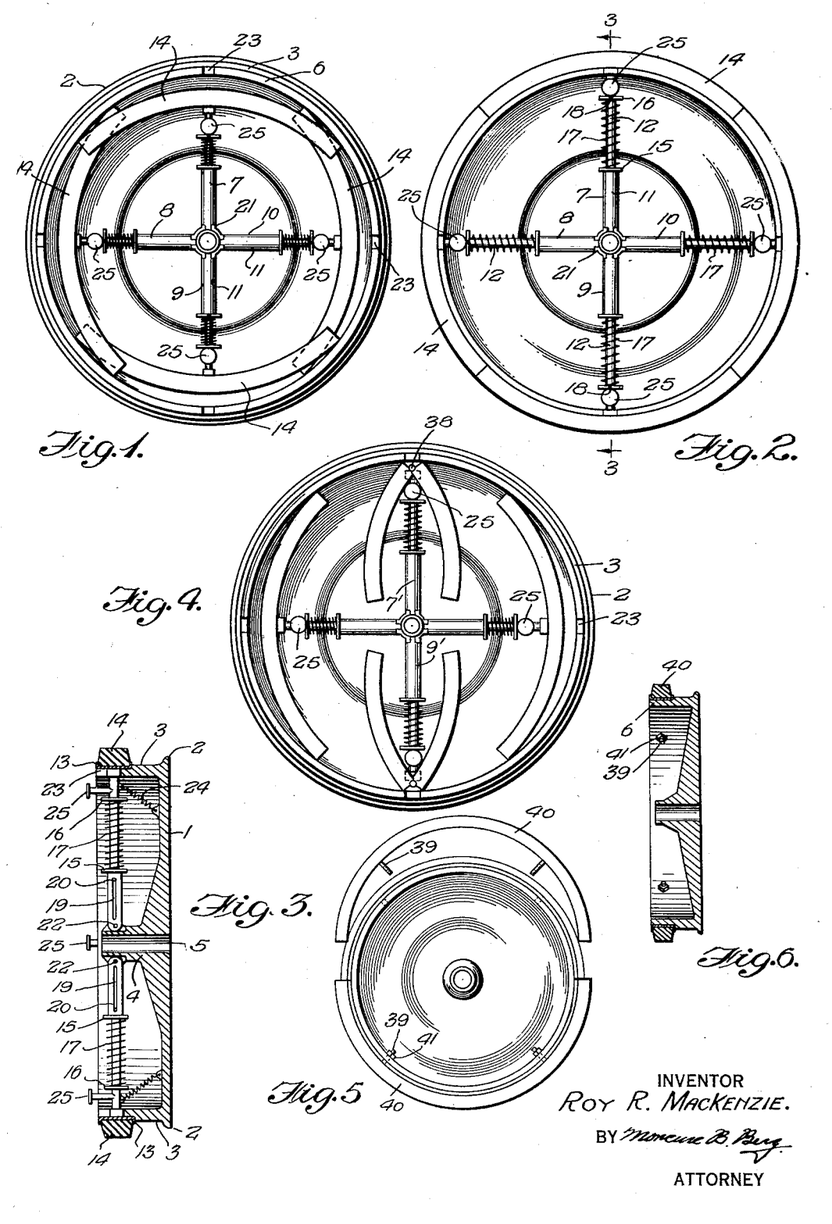
Figure 1 is a front elevation of one type of my convertible wheel showing the same ready for use as a railway wheel.
Figure 2 is a view similar to Figure 1, but showing the wheel operating as a highway wheel.
Figure 3 is a sectional elevation taken on the line 3—3 of Figure 2.
Figure 4 is a front elevation of a convertible wheel showing a different mounting for the highway members associated therewith, than the constructions shown in Figures 1-3.
Figure 5 is a front elevation of still another modification of my convertible wheel in which the rim and tire sections are attached to the wheel only when it is employed for highway use.
Figure 6 is a sectional elevation through the center of the wheel shown in Figure 5, a rim section with tire being mounted upon the railway wheel.
Figure 7:
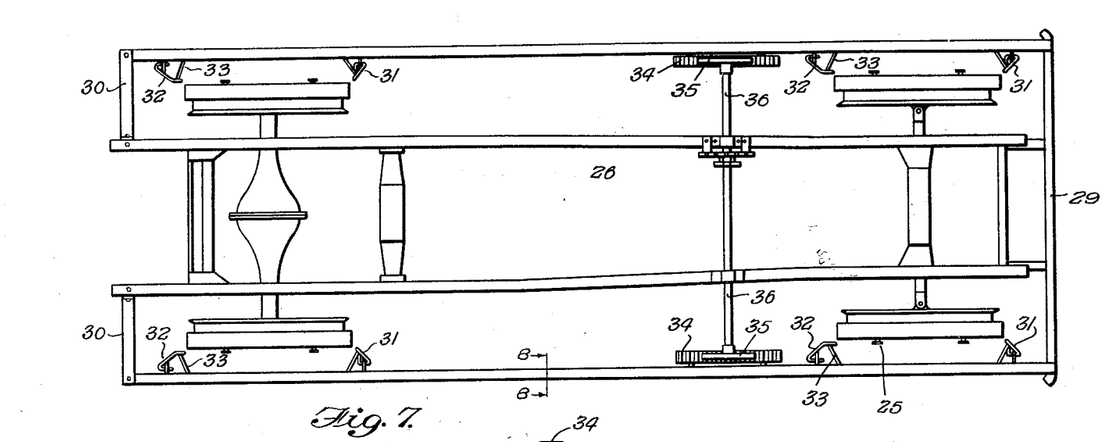
Figure 7 is a plan view of an automobile chassis having the wheels of my invention associated therewith, and also shows the means for changing the wheels from one type to another.

Throughout the drawings like reference numerals refer to similar parts in the different views. In Figures 1-3 I have shown one form of the invention in which there is provided a solid master wheel 1 of the railway type. To this end the wheel 1 has provided a rail flange 2 and rail tread 3. At the center of the master wheel 1 there is formed an extension providing a hub 4 which has a suitable bore for receiving an axle 5, the wheel being mounted upon the latter in any desired and conventional manner.

For the purpose of providing a seat for the highway sections or segments of a highway wheel, to be hereinafter described, the rail tread 3 is formed with a shoulder 6, the outer face of which is below the outer face of the tread 3. Obviously, if desired, the shoulder 6 need not be made a continuation of the rail tread, but can be formed separately therefrom, as for example, below the tread.

The master wheel 1, may be formed of any metal suitable for the purpose, though other suitable materials may be employed as for example wood, fibre, and the like. While I have shown the master wheel as being of the solid type, the invention is in nowise limited to the use of such, for other types of wheels may be employed and constructional variations, well known to those skilled in the art, may be made in the wheel shown without departing from the spirit of the invention or the scope of the appended claims.

As may be noted, especially well in Figures 1 and 3, each of the highway members, generally designated by the reference numerals 7, 8, 9 and 10, comprises a sleeve 11 in which is slidably mounted one end of a spoke or tire arm 12, the other end thereof being secured to a circular rim segment or section 13 which is provided with a corresponding tire section 14. The arm 12 of each rim section is fixedly secured to the center of the rim along the center line of its under surface by any conventional construction, for example, the manner in which a spoke is secured to the felly of a wheel.

For the purpose of extending each rim section, the end of the sleeve 11 is provided with a collar 15 while a similar collar 16 is secured to the spoke arm 12. Between each collar 15 and 16 of each highway member, there is provided a suitable spring 17. To allow adjustment of each spring 17, its upper collar is slidably mounted upon its tire arm and is secured thereto by a set screw or other fastening 18. By this expedient, the compression on the spring 15, may be controlled within desired limits.

The sleeve 11 of each tire section, in the event that the tire arms 12 have a circular cross section, is provided with a slot 19 which engages a suitable pin 20, formed upon each arm 12, rotation of the tire arm being thus prevented. Should, however, the tire arm be of a rectangular cross section, this practice is not necessary.

Mentioned as one of the objects of my invention, is the provision of a convertible wheel which carries the highway members when they are not in use. To accomplish this the hub member 4 is provided with a plurality of ears 21, a pair being provided for each highway member. As may be noted, in Figure 3, the lower end of each sleeve 11 is so shaped that it will fit between a pair of ears 21 and is provided with an opening through which suitable fastening means 22 may pass so that the sleeve, and consequently the highway members, will be pivotally mounted upon the hub of the master wheel.

The manner of mounting the highway members so that they are carried by the master wheel will now be appreciated and it will be obvious that they may be nested in the position shown in Figure 1 for inoperative positions and moved outwardly from the face of the wheel so as to allow the rim sections to be raised and thence inwardly so as to seat upon the shoulder 6. To allow such movement, the shoulder 6 is provided with a plurality of rectangular cut away portions 23 so that the arms 12 of each highway member may pass therethrough, as is clearly indicated in Figure 3. Also for the purpose of maintaining each highway member, drawn inwardly towards the face of the master wheel 1, a spring 24 for each highway member has one end thereof connected to the face of the master wheel, and its other end connected to the tire arm of a highway member.

To facilitate the shifting of the wheel, that is converting it from one type to another, each tire arm 12 is provided with a puller or placement arm 25 which is substantially at right angles to the longitudinal axis of the tire arm.

Assuming that the highway members are in an inoperative position as shown in Figure 1, the manner of converting the same to the highway type will at once be apparent. In Figure 1 the tire and rim section of the highway member 7 overlaps and is on top of the ends of the rim and tire sections of the highway members 8 and 10, while the other end of the rim and tire section of the highway member 8 overlaps one end of the tire and rim sections of the highway member 9, the opposite end of the highway member 9 overlapping one end of the rim and tire section of the highway member 10.

The wheel is rotated so that the free highway member 7 is in the position shown, whereupon by exerting a downward pull on the placement arm 25 and then pulling outwardly this tire and rim section may be removed from its position within the master wheel. Due to the action of the spring 17 the tire and rim section of the highway member 7 will be raised upwardly and by reason of its spring 24, which is under tension, will be pulled inwardly, and seated and maintained upon the shoulder 6. On the removal of the rim and tire section of the highway member 7 from within the master wheel 1, the rim and tire section of the highway member 8 is freed and this may be similarly positioned upon its shoulder. This operation is continued, with rotation of the wheel, until the completed road tire is formed by placing all of the tire and rim sections upon the shoulder.

When in the position shown in Figures 2 or 3, that is the highway position, the highway members will be maintained on the rim shoulder by reason of the springs 24 so that it will be unnecessary to provide separate fastenings or securing means for each highway member when in this position. Not only does each spring 24 possess this function, but, in addition, it helps to hold the highway members in an inoperative position when placed within the shoulder of the master wheel.

Obviously, when it is desired to reconvert the wheel, that is to change it from the highway to the railway type, the operations just mentioned are gone through in reverse order. That is to say, anyone of the tire or rim sections is pulled off of its seat by exerting a pull towards the outside of the wheel and the tire segment is lowered by compressing the spring on the tire arm. After this, the highway member may then be moved inwardly towards the face of the master wheel and into its inoperative position where the action of the spring on its tire arm will maintain it in contact with the under side of the shoulder 6. After one rim section has been removed, a second may be similarly removed, one end of the second section overlapping an end of the first section. This is continued until all of the rim sections are removed, the final rim and tire section overlapping the ends of its two adjoining sections. In further explanation of the nesting operation, assume that after the first highway member has been nested, in Figure 1 the highway member 10, the wheel is rotated so that this member occupies the relative position of the member 7 shown. Then the next member to be nested will be the one to the right of the member 10 or the member 9. In putting the highway members on their shoulder the free member 7 is removed and then the highway member on its left. Obviously as mentioned, in nesting, any highway member may be first removed for on completion of this operation there will be a free highway member having its ends overlapping its adjacent members. For the sake of convenience this free member has been shown and described as the member 7.

In actual practice, when my invention is is used upon a vehicle, each wheel is placed upon an axle in such a manner that the tire arms of the highway members are similarly positioned with respect to each other so that their angular positions with a horizontal or a vertical plane remain substantially the same when the highway members are in their operative or inoperative position.

Assume that the vehicle is upon a railroad track and it is desired to convert the wheels into the highway type. In as much as the tire on the highway members when employed for highway use, extends beyond the rail flange, but not below the rail, where the track is uncovered and open between the ties thereof, all of the highway sections may be immediately shifted. The vehicle is then run off an end of the track or to a grade crossing or similar covered structure at which point the highway wheels will come in contact with the ground or other surface and the vehicle may now be propelled without the use of rails.

In the event that the vehicle is used upon a track, the space between the ties of which is covered with paving material or the like, as in the case of a street car track, the conversion of the vehicle into the highway type may be accomplished by first moving a highway member on each wheel, which is above the rail, into its operative position. The vehicle is then moved a slight amount so as to rotate the wheels thereof and the section adjoining that already positioned, is moved upon the shoulder of the wheel. As the wheels rotate, the first highway section upon the shoulder will come in contact with the pavement, ground or other surface so that the vehicle is now elevated above the track and is clear of the same. This operation is continued until all of the highway sections have been placed upon their respective shoulders and all of the wheels of the vehicle are of the highway type.

In order to rerail the vehicle, it may be run upon an end of the track which may be provided with a suitably incline so as to allow the rail tread to be raised to engage the rails and free the highway members from contact with the ground or other surface, after which, the highway members may be nested in the manner already explained.

In the event that the highway vehicle is to be placed upon a street car or similar covered track, the vehicle is run upon the same so as to straddle it. Then the highway members above the rail are successively nested, the vehicle being moved so that the railway wheel is finally engaged with the rails.

Obviously, the shifting or conversion of the wheels may be accomplished by hand. However, to facilitate this operation and likewise to decrease the amount of labor necessary, I prefer to employ suitable means for conducting this shifting operation. To this end I have shown the wheels of Figures 1–3 associated with an automobile chassis generally designated by the reference numeral 26. The mechanism for this purpose includes a suitable frame or channel 27 carried by the vehicle frame and in which is slidably mounted a T bar 28.

While I have shown the channel 27 supported upon a bumper or cross bar 29 mounted upon the front end of the vehicle and by suitable support bars 30 at the rear end of the vehicle, it is to be clearly understood that other support means may be employed by those skilled in the art without departing from the spirit of my invention.

Each sliding T member 28 carries two sets of cams 31 and 32 which are supported upon the bar and held at a distance therefrom by tie rods or other suitable supports 33. These cams, as will be presently explained, are adapted to engage the placement arms 25 of the highway members in order that the latter may be shifted as desired.

In addition to carrying the cam surfaces 31 and 32, each sliding T member has mounted thereon racks 34 which are engaged by pinions 35 mounted upon a rotatable shaft 36 supported upon the chassis frame. Keyed or otherwise secured to the shaft 36 is a suitable operating lever 37, the actuation of which will rotate the pinions 36 so as to simultaneously cause the racks to be moved lengthwise of the chassis frame and hence move the sliding T members carrying the cams.

The shifting of the highway members into their desired positions is accomplished by means of the cam members 31 and 32. These members which may be formed of either a flat or round piece of metal and which may be of an irregular cross section, are given a peculiar shape which is adapted to guide the puller or placement arms on each highway member so as to position the latter as desired upon contact with the placement arms and upon rotation of the wheels. Each pair of cams are separated at such a distance from each other that when not performing their shifting function, that is when in their neutral position, each cam is to one side of a wheel. This allows pivotally mounted wheels, for example, steering wheels, to be turned as desired without interference with the cams.

During shifting operations, the lever 37 is operated so as to cause one of each set of cams to come in contact with a placement arm in which position the lever is locked by any suitable locking means associated therewith. The vehicle is then moved which causes the placement arm and consequently its highway member to be shifted as desired.

Figures 8, 9:
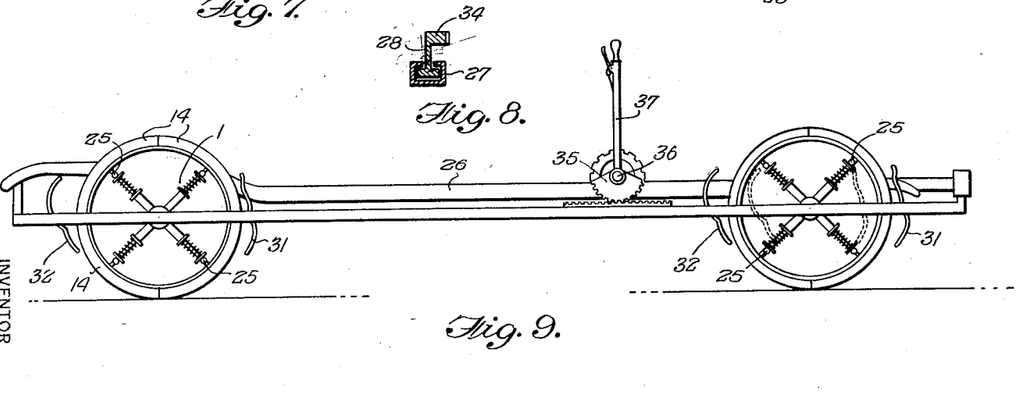
Figure 8 is a sectional view taken along the line 8—8, of Figure 7 and shows in detail the mounting of the frame members carrying the shifting cams.
Figure 9 is a side elevation of the chassis shown in Figure 8.

For example, assuming that the highway members are to be placed upon their shoulder, the lever 37 is actuated so as to move the cam surface 31 for each wheel into the dotted line position shown in Figure 9. In such position, a puller arm of each wheel is engaged by a cam at a point between thirty and forty-five degrees to the right of the vertical. On forward movement of the vehicle, for each wheel the placement arm will be forced downwardly by its contact with the cam surface, thus, freeing its highway member from contact with the under surface of the shoulder. On further rotation of the wheel, the cam surface allows the placement arm to move outwardly and thence by reason of a bend in the cam, to move upwardly, this being aided by the spring 17. At this point, another bend in the cam raises the tire arm a small amount, so that clearance between the rim and the shoulder is provided. Finally the cam curves inwardly and through the aid of this inward guide surface and the spring 24, the highway member is pulled inwardly so that the rim will be seated upon its shoulder. On further rotation of the wheel, the placement arm is released. By this time, the next adjoining highway member of each wheel is at the upper end of cam 31 and the foregoing operation is repeated. Such action continues until all of the highway members are seated upon their shoulders.

When it is desired to remove the highway members and nest them, the cams 32 are employed. This cam, for each wheel, is moved to the position shown in the dotted line in Figure 9, and engages a placement arm at a point substantially opposite to that at which the cam surface 31 first becomes engaged with a placement arm. On rearward movement of the vehicle or rotation of each wheel in a counter clockwise direction as viewed in Figure 9, the highway member engaged is forced off of its seat, compressed against its spring, and moved inwardly between the rim shoulder and the hub, after which, it is released. Upon the release of the placement arm, the highway member is extended by reason of its spring so that it is engaged with the under surface of the rim shoulder. At the same time the cams 32 are now ready to engage the adjoining highway member of each wheel and nest the same within its rim shoulder.

Of course, the distance which a wheel must move in order to shift a highway member into either position will be determined by the cam angles themselves and the angular position of the cams with their carriage, both of which may be varied as desired. While the free highway member in nested position, for example the highway member 7 as shown in Figure 1, must be first removed, it will be appreciated that its position with respect to a cam 31 may be readily determined by a person outside of the vehicle so that when in the proper location as indicated in Figure 9, it will be engaged by the cam surface and mounted on the rim shoulder. Of course, in nesting the highway members, it makes no difference which member is first removed from the rim shoulders as already explained.

By placing each wheel upon its axle so that the highway members are in the same relative position with respect to each other, that is so their tire arms will make the same relative angles with the vertical or horizontal, the simultaneous shifting of a highway member on each wheel may be accomplished.

It is to be understood that my invention is not limited to the type of mechanism, which for the purpose of explanation has been made the subject of illustration, for supporting and causing the actuation of the cams 31 and 32. Within the scope of the invention is included any type of sliding support and any suitable actuating means therefor, as for example, electrical or fluid pressure operated means or any combination of these by themselves or with mechanical means.

While I have disclosed a master wheel employing four highway members, it will be appreciated that either a greater or lesser number may be employed if desired. Likewise through the use of shorter rim and tire sections and by employing fillers, which may be attached to the rim shoulder, the highway members may be nested so that there is no overlapping of the ends of the rim and tire sections thereof.

In Figure 4 I have disclosed a slightly modified wheel construction from that previously explained in as much as two of the rim and tire sections are formed of two members hinged to each other at their center, through means of suitable hinge pins 38. The hinge pin 38 allows the rim and tire sections of the highway members 7' and 9' to be collapsed, as shown in Figure 4. Preferably when employing this form of the invention, the shifting of the highway members 7' and 9' is done manually.

Up to the present, the type of wheels disclosed have their highway members constantly affixed thereto so that they are always carried by the master wheel whether in use or not. The main difficulty in providing separate highway wheels, has heretofore been in their size and cumbersome construction, likewise the difficulties encountered when changing from one type of wheel to another. In Figures 5 and 6, however, I have shown a novel type of wheel similar in respect to those previously disclosed, but in this instance, using separate rim and tire sections which are carried separately from the wheel.

For providing an extremely light construction, in which the parts may be handled with great facility and ease, I make use of the wheel, heretofore described. In this instance, however, the rim shoulder 6 need not have the cut away portions formed thereon, but is provided with a plurality of openings through which may be inserted threaded pins or bolts 39 positioned upon the rim and tire sections 40. These rim sections may be of any number desired, there being disclosed only two of them, for the purpose of explanation.

In operation a rim and tire section 40 is placed upon the rim shoulder so that the bolts 39 extends through their corresponding openings therein and may be secured thereon by nuts 41 placed upon the threaded ends of the bolts. After one tire and rim section has been placed upon the wheel, it may be rotated so as the second section may be secured.

The wheel construction of Figures 5 and 6 greatly facilitates the ease with which the rim and tire sections may be applied and allows a lightly constructed rim due to the rim shoulder extending outwardly from the rail thread and being below the same so as to form an abutment or contact area for the inner side of the rim. Also, as is the case of all the wheels disclosed, the projection of the shoulder gives a free working space for the application and removal of the highway members.

The invention forming the subject matter of this application is designed particularly for use with motor trucks and trailers, especially those of light type, though it will be appreciated that the inventive concept is not limited to this class of vehicles alone, but may be successfully applied to other classes of vehicles as well.

From the foregoing description it will be appreciated that I have provided a novel convertible wheel which may be employed for either highway or railway usage. By providing an extension shoulder on the wheel I am enabled to employ light weight highway members each including a plurality of rim and tire sections which may be separated from the wheel or constantly carried thereby.

In the later instance, just refered to, the time and labor which needs be expended in converting the wheel from one type to another is greatly reduced by the construction expedient employed and through the use of shifting mechanism carried by the vehicle itself is reduced to a minimum. To also be observed is the fact that the wheels forming the subject of my invention are of simple construction and may be converted from one type to another with great ease. Moreover, any of the wheels and the mechanism disclosed may be applied to vehicles, in present use, with only slight structural changes needed in the vehicle for supporting the shifting apparatus.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a convertible wheel for railway and highway use, a hub, a rail flange, and a rail tread, a rim shoulder forming an extension of the rail tread and having its upper surface below that of the rail tread, said rim shoulder forming a seat for a plurality of circular rim sections with tire thereon.

2. A convertible wheel for railway and highway use comprising in combination with a master wheel having a rail flange, a rail tread, and a rim shoulder forming an extension of the rail tread positioned below the same and extending around the circumference of the wheel, a plurality of circular rim sections with tire sections thereon, said rim sections when in use being seated upon the rim shoulder and secured thereto so that they contact with the side face of said rail tread.

3. A convertible wheel for railway and highway use comprising a master wheel having a hub, a rail tread, and rail flange, a rim shoulder forming an extension of the rail tread, and a plurality of highway members secured to the master wheel and constantly carried therewith, each of said highway members including a rim section with tire section thereon, and means for connecting each rim and tire section to the hub of the master wheel and for allowing movement thereof into operative position on the rim shoulder and out of operative position into the space between the rim shoulder and the hub.

4. A convertible wheel for railway and highway use comprising a master wheel having a hub, a rail tread, and rail flange, a rim shoulder forming an extension of the rail tread, and a plurality of highway members secured to the master wheel and constantly carried therewith, each of said highway members including a rim section with tire section thereon, and means for connecting each rim and tire section to the hub of the master wheel and for allowing movement thereof into operative position on the rim shoulder and out of operative position into the space between the rim shoulder and the hub, said highway members when in their inoperative position lying in planes substantially at right angles to the axis of rotation of the master wheel.

5. A convertible wheel for railway and highway use comprising a master wheel having a hub, a rail tread and rail flange, a rim shoulder forming an extension of the rail tread and a plurality of highway members, each of said highway members including a sleeve pivotally mounted upon the face of the wheel, a tire arm for each sleeve, having one of its ends slidably mounted therein and its other end fixed at the center of the under surface of a rim section having a tire section thereon, said highway members when in inoperative position being nested within the space between said shoulder and said hub, and when in operative position being seated on said shoulder, the rim shoulder being provided with cut away portions to allow the tire arms to pass therethrough.

6. A convertible wheel for railway and highway use comprising a master wheel, having a hub, a rail tread and a rail flange, a rim shoulder forming an extension of the rail tread and a plurality of highway members, each of said highway members including a sleeve pivotally mounted upon the face of the wheel, a tire arm for each sleeve having one of its ends slidably mounted therein and its other end fixed to the under surface of a rim section with tire section thereon, and means associated with each tire arm for causing its extension, said highway members when in inoperative position, being nested within the space between said shoulder and said hub, and when in operative position being seated on said shoulder, the rim shoulder being provided with cut away portions to allow the tire arms to pass therethrough.

7. A convertible wheel for railway and highway use comprising a master wheel, having a hub, a rail tread and rail flange, a rim shoulder forming an extension of the rail tread and a plurality of highway members, each of said highway members including a sleeve pivotally mounted upon the face of the wheel, a tire arm for each sleeve, having one of its ends slidably mounted therein and its other end fixed at the center of the under surface of a rim section with tire section thereon, means associated with each tire arm for causing its extension, and other means associated with each tire arm and secured to the master wheel for exerting a constant inward pull upon said tire arms, said highway members when in inoperative position being nested within the space between said shoulder and said hub, and when in operative position being seated on said shoulder, the rim shoulder being provided with cut away portions to allow the tire arms to pass therethrough.

8. A convertible wheel for railway and highway use comprising a master wheel having a hub, a rail tread and rail flange, a rim shoulder forming an extension of the rail tread and a plurality of highway members, each of said highway members including a sleeve pivotally mounted upon the face of the wheel, a tire arm for each sleeve, having one of its ends slidably mounted therein and its other end fixed at the center of the under surface of a rim section having a tire section thereon, said highway members when in inoperative position being nested within the space between said shoulder and said hub, and when in operative position being seated on said shoulder, the rim shoulder being provided with cut away portions to allow the tire arms to pass therethrough, means associated with each tire arm for maintaining it in its nested position and for extending the same, and other means associated with the wheel and each highway member for maintaining the same upon its rim seat when in operative position.

9. A convertible wheel for railway and highway use comprising a master wheel, having a hub, a rail tread and rail flange, a rim shoulder forming an extension of the rail tread and a plurality of highway members, each of said highway members including a sleeve pivotally mounted upon the hub of the master wheel so as to swing outwardly, a tire arm slidably mounted within each of said sleeves, the free end of each tire arm being secured to the center of the under surface of a rim section having a tire section thereon, a collar positioned on the end of each sleeve, a second collar positioned on each tire arm, a spring surrounding each tire arm and positioned between the collars thereon, a second spring secured to each tire arm and to the face of the master wheel, each of said tire arms being provided with a placement arm for shifting the highway member into and out of operative position, said highway members when in inoperative position being nested within the space between said shoulder and said hub, and when in operative position being seated on said shoulder, the rim shoulder being provided with cut away portions to allow the tire arms to pass therethrough.

10. In a vehicle, wheels therefor of the convertible highway-railway type, each of said wheels comprising a master wheel provided with a rail tread and a rail flange, with a rim shoulder forming an extension of the rail tread, the master wheel having a plurality of highway members carried thereon, each of said highway members including a rim section with tire section, the highway members of each wheel when in inoperative position being nested within the recess formed by the shoulder of each wheel and seated upon the rim shoulder when in operative position, and means carried upon the vehicle for engaging said highway members and shifting them from one postion to another.

11. In a vehicle, wheels therefor of the convertible highway-railway type, each of said wheels comprising a master wheel provided with a rail tread and a rail flange, with a rim shoulder forming an extension of the rail tread, the master wheel having a plurality of highway members carried thereon, each of said highway members including a rim section with tire section, the highway members of each wheel when in inoperative position being nested within the recess formed by the shoulder of each wheel and seated upon the rim shoulder when in operative position, and means carried upon the vehicle for engaging said highway members and shifting them from one position to another, and other means associated with the vehicle for causing said shifting means to simultaneously engage one highway member on each wheel at a time for shifting purposes.

12. In a vehicle, wheels therefor of the convertible highway-railway type, each of said wheels comprising a master wheel provided with a rail tread and a rail flange, with a rim shoulder forming an extension of the rail tread, the master wheel having a plurality of highway members carried thereon, each of said highway members including a rim section with tire section, the highway members of each wheel when in inoperative position being nested within the recess formed by the shoulder of each wheel and seated upon the rim shoulder when in operative position, and means carried upon the vehicle for engaging said highway members and shifting them from one position to another, and other means associated with the vehicle for causing said shifting means to simultaneously engage one highway member on each wheel at a time and shift the same on movement of the vehicle.

13. In a vehicle, wheels therefor of the convertible highway-railway type, each of said wheels comprising a master wheel provided with a rail flange and rail tread, a rim shoulder forming an extension of said rail tread and a plurality of highway members carried by each master wheel, each of said highway members including a tire arm pivotally secured to said master wheel, a rim section with tire section thereon being secured to each tire arm, the highway members of each wheel when in inoperative position being nested within the recess of each wheel formed by the rim shoulder and seated upon the rim shoulder when in operative position, and a plurality of cams mounted upon said vehicle so as to engage said tire arms and shift one highway member at a time of each wheel, from one position to another.

14. In a vehicle, wheels therefor of the convertible highway-railway type, each of said wheels comprising a master wheel provided with a rail flange and rail tread, a rim shoulder forming an extension of said rail tread and a plurality of highway members carried by each master wheel, each of said highway members including a tire arm pivotally secured to said master wheel, a rim section with tire section thereon being secured to each tire arm, the highway members of each wheel when in inoperative position being nested within the recess of each wheel formed by the rim shoulder and seated upon the rim shoulder when in operative position, a plurality of cams slidably mounted upon said vehicle, and means for moving a cam into engagement with a highway member of each wheel so as to simultaneously shift the highway members of each wheel one at a time from one position to another on movement of the vehicle.

15. In a vehicle, wheels therefor of the convertible highway-railway type, each of said wheels comprising a master wheel provided with a rail flange and rail tread, a rim shoulder forming an extension of said rail tread and a plurality of highway members carried by each master wheel, each of said highway members including a tire arm pivotally secured to said master wheel, a rim section with tire section thereon being secured to each tire arm, the highway members of each wheel when in inoperative position being nested within the recess of each wheel formed by the rim shoulder and seated upon the rim shoulder when in operative position, a pair of cams associated with each wheel, said cams being slidably mounted upon the vehicle, and means for selectively moving the corresponding cam of each pair into engagement with a highway member of each wheel for simultaneously shifting the highway members of each wheel one at a time from one postion to another.

16. In a vehicle, wheels therefor of the convertible highway-railway type, each of said wheels comprising a master wheel provided with a rail flange and rail tread, a rim shoulder forming an extension of said rail tread and a plurality of highway members carried by each master wheel, each of said highway members including a sleeve pivotally mounted upon said master wheel, a tire arm slidably mounted within each of said sleeves, and a rim section with tire section therefor secured to each tire arm, the highway members of each wheel when in inoperative position being nested within the recess of each wheel formed by the rim shoulder and seated upon the rim shoulder when in operative position, and a plurality of cams mounted upon said vehicle so as to engage said tire arms and shift one highway member at a time of each wheel, from one position to another.

17. In a vehicle, wheels therefor of the convertible highway-railway type, each of said wheels comprising a master wheel provided with a rail flange and rail tread, a rim shoulder forming an extension of said rail tread and a plurality of highway members carried by each master wheel, each of said highway members including a sleeve pivotally mounted upon said master wheel, a tire arm slidably mounted within each of said sleeves, and a rim section with tire section therefor secured to each tire arm, the highway members of each wheel when in inoperative position being nested within the recess of each wheel within the rim shoulder and seated upon the rim shoulder when in operative position means associated with each tire arm for extending the same, other means connected to each tire arm and to said master wheel for exerting a constant inward pull upon the same, and a plurality of cams mounted upon said vehicle so as to engage said tire arms and shift one highway member at a time of each wheel, from one position to another.

18. A convertible wheel for railway and highway use comprising a master wheel having a hub, a rail tread and rail flange, a rim shoulder forming an extension of the rail tread and a plurality of highway members, each of said highway members including a sleeve pivotally mounted upon the face of the wheel, a tire arm for each sleeve, one end of each tire arm being slidably mounted within its corresponding sleeve, the other end of said tire arm being secured to a circular rim section with tire section thereon, certain of said rim sections being of one piece construction, other of said rim sections being formed of two rim members having their adjoining ends hinged to each other so as to allow the rim members to swing inwardly towards their tire arm, said highway members when in inoperative position being nested within the space between the rim shoulder and hub, said hinged rim members being collapsed, and said highway members when in operative position being seated on said shoulder, the rim shoulder being provided with cut away portions to allow the tire arms to pass therethrough.

19. In a convertible wheel for railway and highway use, a master wheel having a rail flange, a rail tread and a rim shoulder forming an extension of the rail tread positioned below the same and extending around the circumference of the wheel and a plurality of highway members each including a circular rim section with tire section thereon, a plurality of pins provided upon the inner surface of each rim section, said rim seat provided with openings passing therethrough for receiving said pins when the tire and rim sections are seated upon the rim shoulder, and means engaging each pin of each rim section for securing the latter to said rim shoulder.

20. In a convertible wheel for railway and highway use, including a hub, a rail flange, a rail tread, and a rim shoulder forming an extension of the rail tread, a plurality of highway members, each comprising a circular rim section with tire therefor, each of said highway members being constantly carried by the wheel and secured to the hub of the wheel through a pivotable and extensible mounting.

21. In a vehicle, wheels therefor of the convertible highway-railway type, each of said wheels comprising a master wheel provided with a rail tread and rail flange, with a rim shoulder forming an extension of the rail tread, the master wheel having a plurality of highway members constantly carried thereby, each of said highway members being secured to the hub of the master wheel through a pivotable and extensible mounting, each of said highway members including a rim section with tire section, the highway members of each wheel when in inoperative position being nested within the recess formed by the shoulder of each wheel and seated upon the rim shoulder when in operative position, and means carried upon the vehicle for engaging said highway members and shifting them from one position to another.

22. In a vehicle, wheels therefor of the convertible highway-railway type, each of said wheels comprising a master wheel provided with a rail flange and rail tread, a rim shoulder forming an extension of said rail tread and a plurality of highway members carried by each master wheel, each of said highway members including a tire arm pivotally secured to said master wheel, a rim section with tire section thereon being secured to each tire arm, each of said tire arms being provided with a placement arm extending in a direction away from the face of the wheel, the highway members of each wheel when in inoperative position being nested within the recesses of each wheel formed by the rim shoulder and seated upon the rim shoulder when in operative position, and a plurality of cams mounted upon said vehicle so as to engage the placement arms associated with the tire arms and shift one highway member at a time of each wheel from one position to another.

23. In a vehicle having wheels of the railway type, the rail tread of each wheel being provided with an extension shoulder, a plurality of highway members associated with said wheels, each of said highway members including a rim section with tire thereon, and means upon the vehicle for mounting the rim of each highway member on a shoulder of a wheel and for removing the same from said shoulder.

In testimony whereof he affixes his signature.

ROY R. MacKENZIE.